United States Patent [19]

Yamaguchi

[11] Patent Number: 5,343,225
[45] Date of Patent: Aug. 30, 1994

[54] BUFFERING METHOD

[75] Inventor: Akira Yamaguchi, Kanagawa, Japan

[73] Assignee: Fuji Photo Film Co., Ltd., Kanagawa, Japan

[21] Appl. No.: 958,818

[22] Filed: Oct. 9, 1992

[30] Foreign Application Priority Data

Oct. 11, 1991 [JP]  Japan .................................. 3-264131

[51] Int. Cl.$^5$ ............................................. H04N 1/21
[52] U.S. Cl. ..................................... 346/108; 358/296
[58] Field of Search ................. 346/108, 107 R, 76 L, 346/1.1, 160; 358/296, 298, 300, 302; 395/164, 157, 100, 101

[56] References Cited

U.S. PATENT DOCUMENTS 5,157,417 10/1992 Anzai .................................. 346/108
5,189,439 2/1993 Yumoto et al. ................. 346/76 PH

FOREIGN PATENT DOCUMENTS 62-35765 2/1987 Japan .

Primary Examiner—Mark J. Reinhart
Attorney, Agent, or Firm—Sughrue, Mion, Zinn, Macpeak & Seas

[57] ABSTRACT

Disclosed is a method of buffering image information in which stored data in a frame memory is readout, and the readout data is written onto a recording medium on a line-by-line basis at a writing speed m (m is an integer) times as large as the speed of the reading, the method comprising steps of: changing-over sides of two buffer memories one of which is assigned interchangeably to a reading side and the other to a writing side, each having capacity for a single record line on a recording medium; reading stored data corresponding to the single record line in size from the frame memory and writing the readout data to the writing side buffer memory at the same speed as the speed of reading the stored data from the frame memory; and reading m times repeatedly, during said step of writing, data having been stored immediately before in the reading side buffer memory and supplying the readout data to a writing unit at the same speed as speed of writing in the writing unit.

3 Claims, 4 Drawing Sheets

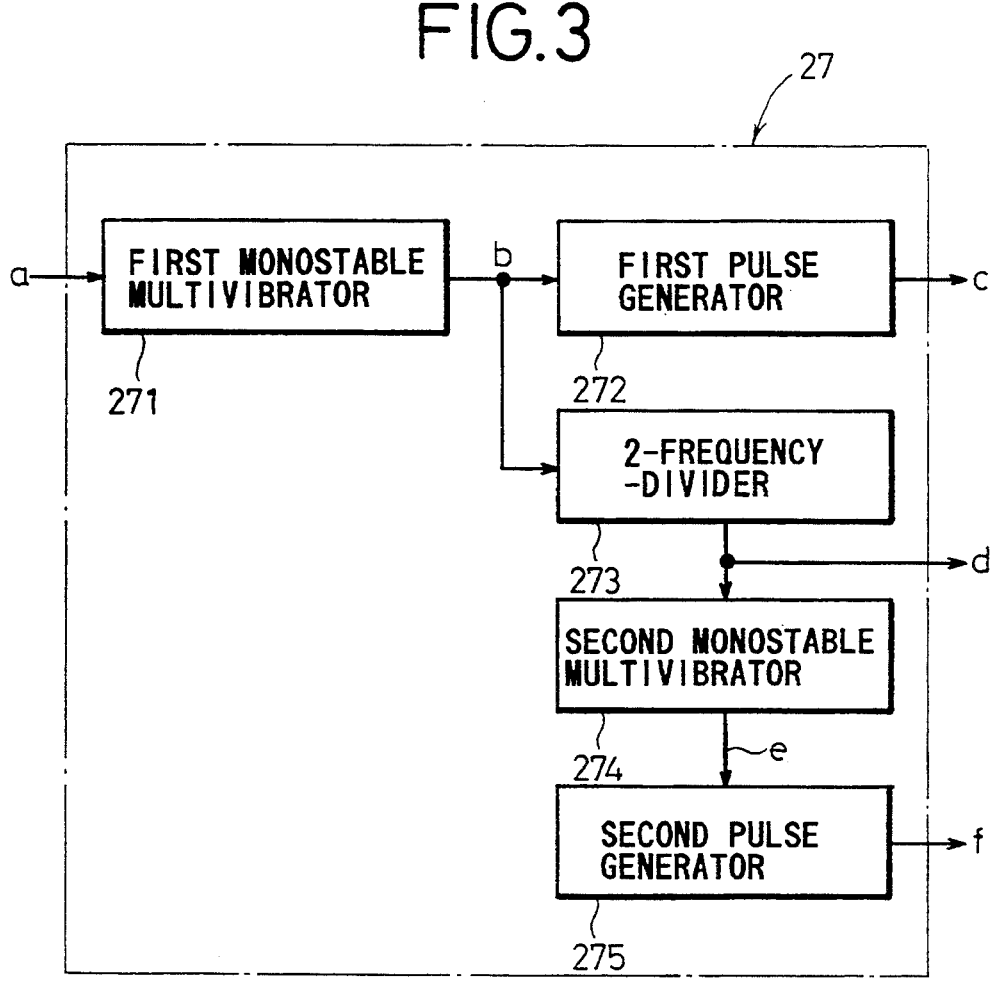

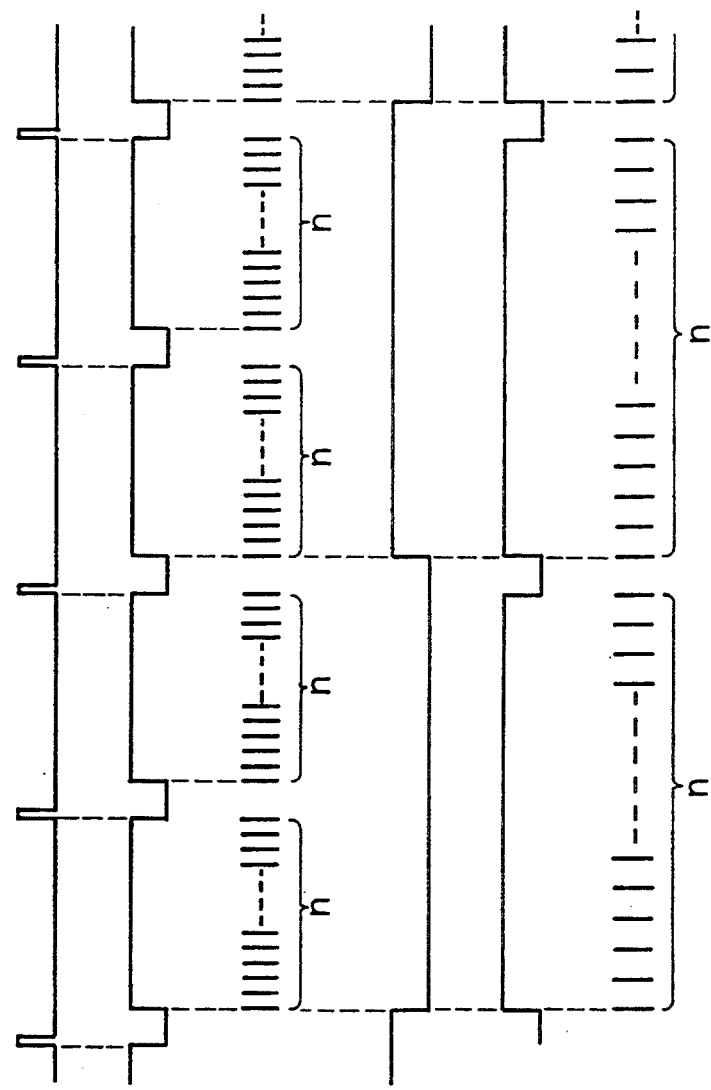

BUFFERING METHOD

BACKGROUND OF THE INVENTION

1. Field of the Invention

The present invention relates to a method of buffering image information suitable for use in a laser printer and the like, and more specifically, to a buffering method applicable to a case in which speed of reading-out the image information from a frame memory is slower than speed of writing the information onto a recording medium.

2. Description of the Related Art

An image information recording apparatus is widely in use, in which, for example, an image corresponding to the image information is recorded two-dimensionally onto a recording medium such as an unexposed film subjected to sub-scanning, by a laser beam modified by the image information and principally scanned by a rotating multiple surface mirror (a polygon mirror). In such an apparatus, multiple reflecting surfaces of the polygon mirror are used for scanning the laser beam. The laser beam is generated by a semiconductor laser, modified by the image information readout from a frame memory into which the image information has been stored, and sent to the polygon mirror.

In an image information recording apparatus such as the above, where the image information for each record line is written on the recording medium with the aid of each surface of the polygon mirror, the image information can be written realtime without a buffer memory if the reading-out speed is matched with the recording speed, provided that speed of reading-out the image information from the frame memory is greater than speed of writing the image information onto the recording medium based on the rotational speed of the polygon mirror.

However, when the writing speed is increased and it exceeds the reading-out speed, buffer memories become necessary to be provided between the frame memory and a writing unit. There has been conventionally a problem that the larger is the speed difference, the larger buffer memory becomes necessary.

SUMMARY OF THE INVENTION

It is an object of the present invention to provide a buffering method by which it is possible to reduce capacity of buffer memories and simplify circuitry for controlling read/write operations of the buffer memories and generating a changeover signal for the buffer memories.

To achieve the above object, the invention provides a buffering method in which stored data in a frame memory is readout, and the readout data is recorded onto a recording medium on a line-by-line basis at recording speed m (m is an integer) times greater than speed of reading-out the data, the method comprising steps of: changing-over sides of two buffer memories one of which is assigned interchangeably to a reading side and the other to a writing side, each having capacity corresponding to a single record line on a recording medium: reading-out the stored data of a single record line from the frame memory and writing the readout data to the writing side buffer memory at the same speed as speed of reading-out the stored data from the frame memory: and reading m times repeatedly, during said step of writing, data having been stored immediately before in the reading side buffer memory and supplying the readout data to a writing unit at the same speed as writing speed of the writing unit.

In the above-stated buffering method, a changeover signal for changing-over the sides of the buffer memories may be produced by m-frequency-division of a synchronizing signal outputted from synchronizing signal generation means disposed at a position corresponding to a margin on the recording medium; a clock pulse for reading data from the reading side buffer memory may be produced by generating pulses whose number of pulses during a time period between the synchronizing signal pulses is the same as the number of picture elements included in the single record line; and a clock pulse for writing data to the writing side buffer memory and for reading data from the frame memory may be produced by generating pulses whose number of pulses during a half cycle of the m-frequency-divided synchronizing signal is the same as the number of picture elements included in the single record line. Further in the above-stated buffering method, the changeover signal for changing-over the sides of the buffer memories may be produced by m-frequency-division of an output signal of a monostable multivibrator triggered by a synchronizing signal outputted from synchronizing signal generation means disposed at a position corresponding to a margin on the recording medium; the clock pulse for reading data from the reading side buffer memory may be produced by generating pulses whose number of pulses during a time period between the trailing edge of the output pulse and the leading edge of a next output pulse from the monostable multivibrator is the same as the number of picture elements included in the single record line; the clock pulse for writing data to the writing side buffer memory and for reading data from the frame memory may be produced by generating pulses whose number of pulses during a half cycle of the m-frequency-divided synchronizing signal is the same as the number of picture elements included in the single record line; and a margin on a starting side of the one record line may be set by a time period between the leading edge of an output of the monostable multivibrator and the trailing edge thereof next to the leading edge.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 3 is a block-diagram showing the construction of a timing pulse generating unit in the embodiment; and FIG. 4 is a timing-chart for explaining the action in the embodiment.

DETAILED DESCRIPTION OF THE PREFERRED EMBODIMENT

Figure 1:
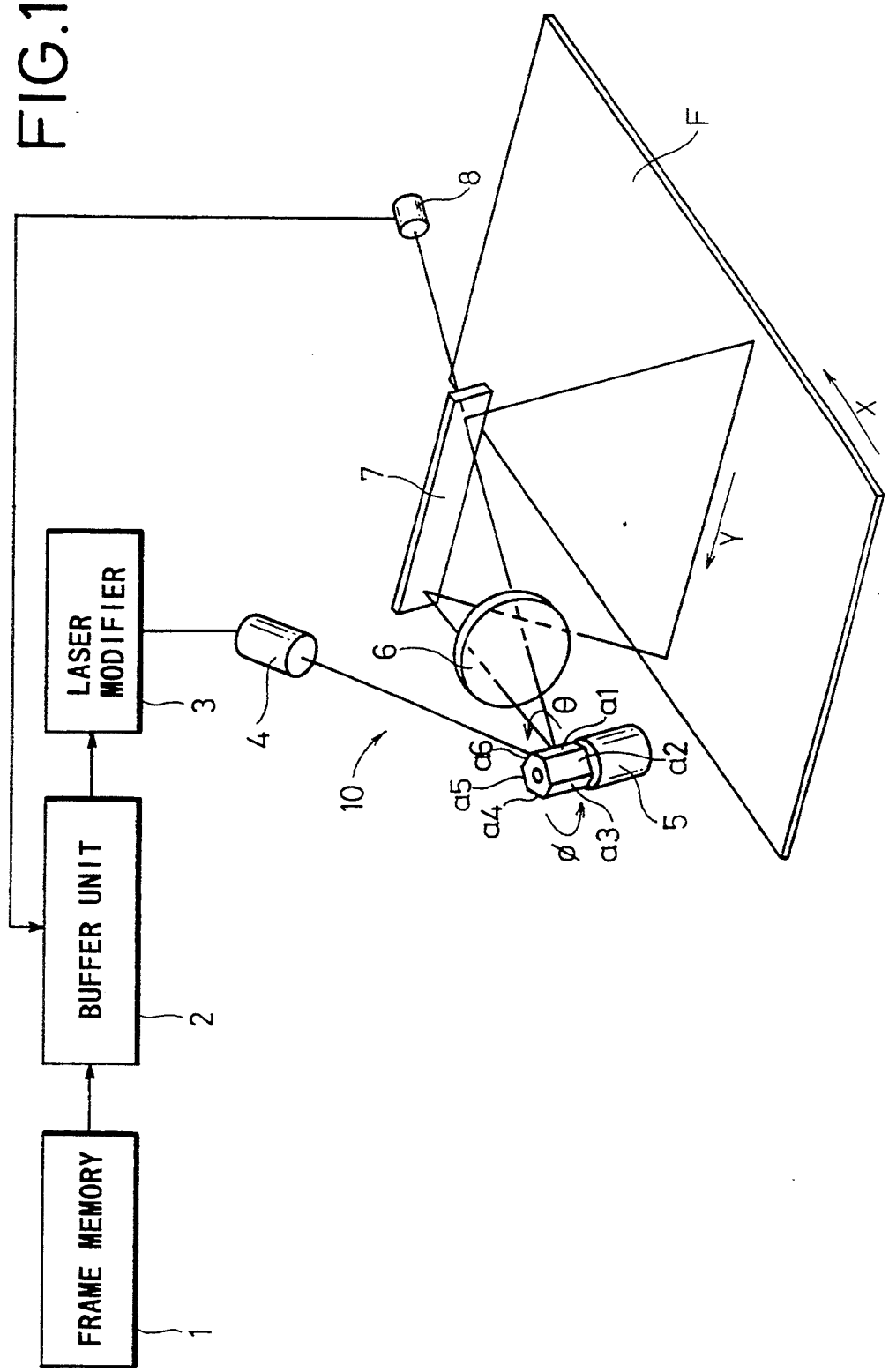
FIG. 1 is a block-diagram showing the construction of an embodiment as application of the method according to the present invention.

FIG. 1 is a block-diagram showing the construction of an embodiment as application of the method according to the present invention. Reference numeral 1 denotes a frame memory, 10 denotes a recording apparatus in which an image is recorded by a laser beam modulated based on an image information stored in the frame memory 1 and primarily scanned in a direction of arrow Y on an unexposed film F as a recording medium which is sub-scanned in the direction of arrow X, and 2 denotes a buffer unit for outputting the image information read out from the frame memory 1 as an input data to the recording apparatus 10.

The recording apparatus 10 comprises, basically, a semiconductor laser oscillator 4, a laser modulator 3 for modulating the laser beam outputted from the semiconductor laser oscillator 4 with the image information outputted from the buffer unit 2, a polygon mirror 5, a scanning lens 6 such as a so-called F$\theta$ lens or the like for focussing incident light at a spot in proportion to the angle of incidence, a half mirror 7, and a photoelectric converter 8 for detecting the beginning point of a margin on the recording medium.

The polygon mirror 5 having reflecting surfaces a1 through a6 and driven rotationally in the direction of arrow $\Phi$ deflects an incident laser beam in the direction of arrow $\theta$ on one of reflecting surfaces, and the deflected beam, then, is irradiated onto the film F via the scanning lens 6 and half mirror 7.

Figure 2:
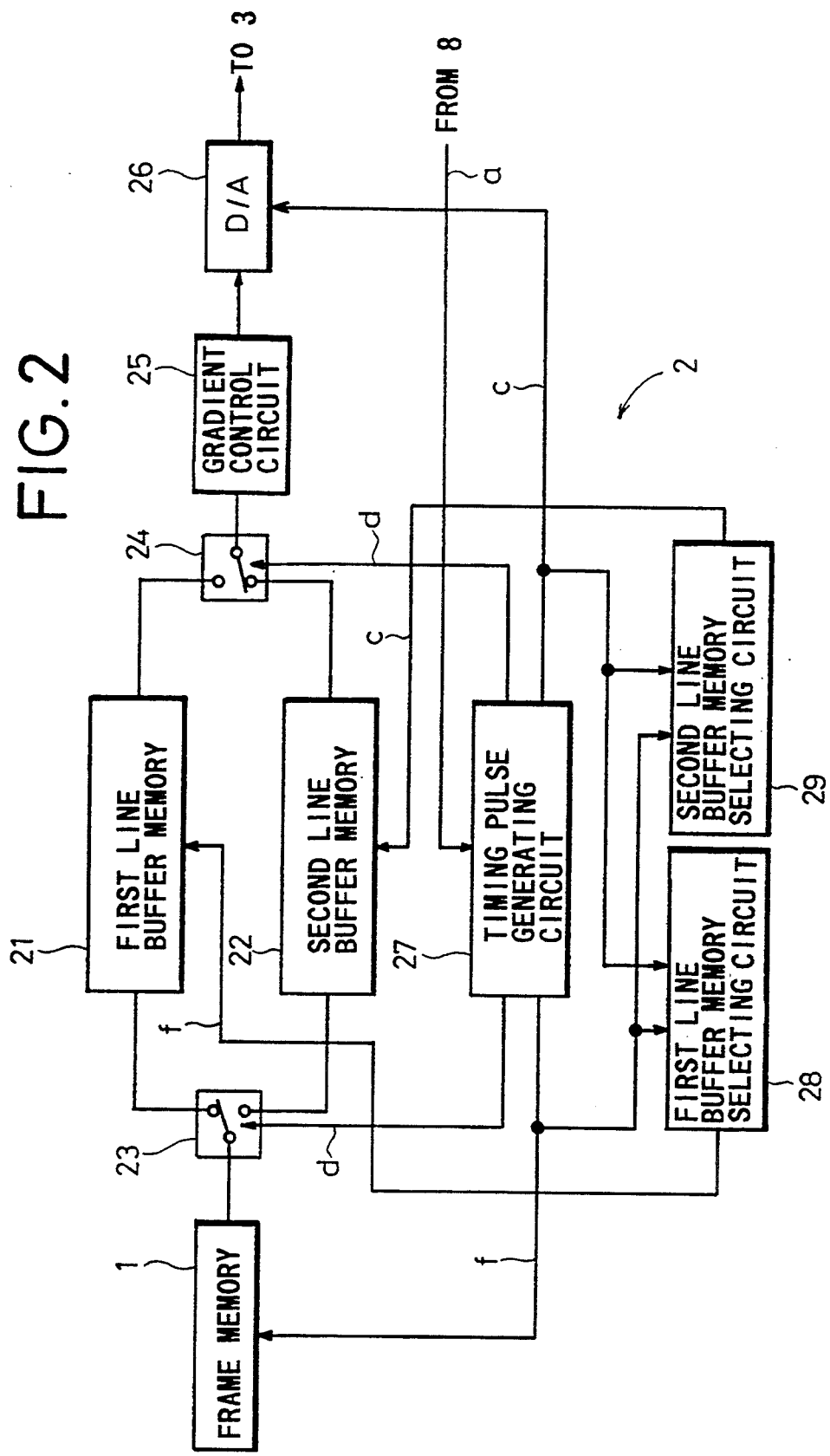
FIG. 2 is a block-diagram showing the construction of a buffer unit in the embodiment.

The buffer unit 2, as shown in FIG. 2, comprises a first line buffer memory 21, a second line buffer memory 22, changeover switches 23 and 24 each selecting different one of the first and second line buffer memories from that selected by the other, a gradient control circuit 25 which is supplied with data read out of one of the line buffer memories selected by the changeover switch 24, a digital to analog (D/A) converter 26 for converting a digital signal outputted by the gradient control circuit 25 to an analog signal, a timing pulse generating circuit 27, a first line buffer memory clock signal selecting circuit 28, and a second line buffer memory clock signal selecting circuit 29.

In the buffer unit 2, data corresponding to a single record line on the recording medium which is readout from the frame memory is written in one of the line buffer memories selected by the changeover switch 23, and during the same time period, data stored in one of the line buffer memories selected by the changeover switch 24 is readout twice repeatedly and supplied to the gradient control circuit 25.

The timing pulse generating circuit 27, as shown in FIG. 3, is supplied with a signal a outputed by the photoelectric converter 8, in which a first monostable multivibrator 271 is triggered by the signal a to generate a pulse train b for setting a left margin, and during the pulse width of the pulse train b, a first pulse generator 272 generates a pulse train c whose number of pulses is equal to the number n of picture elements included in the single record line. The pulse train c is fed to the D/A converter 26 as timing pulses.

In the timing pulse generating circuit 27, the pulse train b is frequency-divided by a 2-frequency-divider 273 from which a pulse train d is supplied to the changeover switches 23 and 24 as a changing-over signal. A second monostable multivibrator 274 is triggered by the leading and trailing edges of a pulse of the pulse train d, and during the pulse width of pulse train e outputted by the second monostable multivibrator 274, a second pulse generator 275 generates a pulse train f whose number of pulses is equal to the number n of picture elements included in the single record line.

The timing pulse generating circuit 27 also supplies the pulse train f to the frame memory 1 as a reading signal, and the pulse trains f and c to the first and second line buffer memory clock selecting circuits 28 and 29 each of which selects different one of pulse trains f and c from that selected by the other in synchrony with the changeover switches 23 and 24, and the circuits 28 and 29 supply the selected pulse trains to the first and second line buffer memories 21 and 22, respectively.

The action of the embodiment constituted as described above will now be explained.

An analog signal outputted from the buffer unit 2 is supplied to the laser modulator 3, and a laser beam modulated with the analog signal is outputted from the semiconductor laser oscillator 4. The laser beam outputted from the semiconductor laser oscillator 4 is irradiated onto the polygon mirror 5, which is rotationally driven, and reflected by the reflecting surfaces a1–a6.

The reflected light from the reflecting surfaces a1–a6 is subjected to primary scanning on the film F in a direction of arrow Y via the scanning lens 6 and half mirror 7, and a part of the reflected light passes through the half mirror 7. Owing to the primary scanning of the reflected light and the sub-scanning of the film F, the image information is recorded on the film F two-dimensionally.

The reflected light passed through the half mirror 7, on the other hand, is received by the photoelectric converter 8 and converted to an electrical signal which is supplied to the buffer unit 2. The photoelectric converter 8 is disposed at a position corresponding to the beginning point of the right margin on the film F, which generates an output signal when the scanned light beam reaches the right margin, the wave form of which is shown in FIG. 4 (a). The output signal of the photoelectric converter 8 acts as a synchronizing signal.

The first monostable multivibrator 274 which receives the synchronizing signal shown by FIG. 4 (a) from the photoelectric converter 8 generates a pulse train b shown in FIG. 4 (b). The time period between pulses b in FIG. 4 (b) corresponds to the length of one recording line without the right and left margins on the film F. Receiving the pulses b and during the time period therebetween, the first pulse generator 272 generates a pulse train c shown in FIG. 4 (c) whose number of pulses is equal to the number of picture elements included in the single record line.

The pulse train b is subjected to frequency division by a 2-frequency-divider 273 to generate a pulse train d shown in FIG. 4 (d). Receiving the pulses d, the second monostable multivibrator 274 is triggered by the leading and trailing edges of each of the pulses d and generates a pulse train e shown in FIG. 4 (e).

Receiving the pulse train e, the second pulse generator 275 generates a pulse train f shown in FIG. 4 (f) whose number of pulses is equal to the number n of picture elements included in the single record line. Thus, the frequency of the pulse train c is approximately twice as large as the frequency of the pulse train f as shown in FIGS. 4 (c) and 4 (f), respectively.

When a pulse of the pulse train d shows a low voltage, the first line buffer memory 21 is selected by the changeover switch 23 and assigned as the writing side, and the second line buffer 22 is selected by the changeover switch 24 and assigned as the reading side.

In this condition, the pulse train f is selected by the first line buffer memory selecting circuit 28 and supplied as a writing signal to the first line buffer memory 21, and the pulse train c is selected by the second line buffer memory selecting circuit 29 and supplied as a reading signal to the second line buffer memory 22.

Accordingly, image data corresponding to the single record line is readout from the frame memory which is supplied with the pulse train f as the reading signal, and the readout image data is written, by way of the change-over switch 23, in the first line buffer memory 21 which is supplied with the pulse train f as the writing signal.

On the other hand, during the time period in which the image data is written in the first line buffer memory 21, the pulse train c is supplied to the second line buffer memory 22 and image data stored therein is readout twice repeatedly. The readout image data are supplied to the gradient control circuit 25 and gradient-controlled. The gradient-controlled image data are, then, converted to an analog data by the D/A converter 26 and outputted to the laser modulator 3.

Modulated by the output signal of the laser modulator 3, the semiconductor laser oscillator 4 generates image modulated laser beam twice based on the twice-readout image data, which are written twice in two adjacent record lines on the film F by using two successive reflecting surfaces of the polygon mirror 5. Therefore, while the image data corresponding to a single record line is written in the first line buffer memory 21, the image data for another single record line is twice repeatedly readout from the second line buffer memory 22 and witten in duplicated record lines which forms a single record line on the film F which is moving with a sub-scanning speed. In this case, the sub-scanning speed of the film F is set to a half of that in the case where a single record line is formed by a single scan.

Next, when a pulse of the pulse train d shows a high voltage, the first line buffer memory 21 is selected by the changeover switch 24 and assigned as the reading side, and the second line buffer 22 is selected by the changeover switch 23 and assigned as the writing side.

In this condition, the pulse train f is selected by the second line buffer memory selecting circuit 29 and supplied as a writing signal to the second line buffer memory 22, and the pulse train c is selected by the first line buffer memory selecting circuit 28 and supplied as a reading signal to the first line buffer memory 21.

Accordingly, image data corresponding to the single record line is readout from the frame memory, and the readout image data is written, by way of the change-over switch 23, in the second line buffer memory 22 supplied with the pulse train f as the writing signal.

On the other hand, during the time period in which the image data is written in the second line buffer memory 22, the pulse train c is supplied to the first line buffer memory 21 and image data stored therein when a pulse of the pulse train d shows a low voltage is readout twice repeatedly. The readout image data is supplied to the gradient control circuit 25 and gradient-controlled. The gradient-controlled image data is, then, converted to an analog data by the D/A converter 26 and outputted to the laser modulator 3.

Also in this case, the frequency of the pulse train c is approximately twice as large as the frequency of the pulse train f as shown in FIGS. 4 (c) and 4 (f), respectively. Therefore, while the image data corresponding to a single record line is written in the second line buffer memory 22, the image data for another single record line is twice repeatedly readout from the first line buffer memory 21 and recorded in duplicated record lines which forms a single record line on the film F moving with the sub-scanning speed which is a half of that in the case where s single record line is formed by a single scan.

According to the invention, as described above, when the speed of reading-out data from the frame memory 1 is slower than the speed of writing data on the film F, providing two line buffer memories each having capacity for a single record line is enough, and generation of control pulses for the line buffer memories is also simplified.

Different from the above-described case, if the recording speed onto the film F is m times as large as the speed of reading-out data from the frame memory, an m-frequency-divider is used in stead of the 2-frequency-divider 273 and a sub-scanning speed is adopted, which is 1/m of that used in the case where a single record line is formed by a single scan.

Incidentally, in the above embodiment, the left margin of the record line is determined by the pulse width of a pulse generated by the first monostable multivibrator 271. However, the left margin can be determined by mechanical means in stead of the first monostable multivibrator 271. In such a case, the pulse train c can be produced by the first pulse generator 272 supplied with the pulse train a, while producing the pulse train d by 2-frequency-dividing of the pulse train a.

Accordingly, by the use of the invented method as explained, if the writing speed of the recording device is m times as large as the speed of reading-out data from the frame memory, two buffer memories are sufficient for buffering image data, each buffer memory having capacity for the single record line, because the stored image data for the single record line is readout m times repeatedly. Further, according to the invented method, changing-over of the buffer memories and controlling of writing the buffer memories can be achieved with simplified circuitry.

What is claimed is:

1. A buffering method in which stored data in a frame memory is readout, and the readout data is written onto a recording medium on a line-by-line basis at a writing speed m (m is an integer) times as large as the speed of the reading, the method comprising steps of:
    changing-over sides of two buffer memories one of which is assigned interchangeably to a reading side and the other to a writing side, each having capacity for a single record line on a recording medium;
    reading stored data corresponding to the single record line in size from the frame memory and writing the readout data to the writing side buffer memory at the same speed as the speed of reading the stored data from the frame memory; and
    reading m times repeatedly, during said step of writing, data having been stored immediately before in the reading side buffer memory and supplying the readout data to a writing unit at the same speed as speed of writing in the writing unit.

2. A buffering method according to claim 1, wherein a changeover signal for changing the sides of the buffer memories is produced by m-frequency-division of a synchronizing signal outputted from synchronizing signal generation means disposed at a position corresponding to a margin of the recording medium; a clock pulse for reading data from the reading side of the buffer memory is produced by generating pulses whose number of pulses during a time period between the synchronizing signal pulses is the same as the number of picture elements included in the single record line; and a clock pulse for writing data to the writing side of the buffer memory and for reading data from the frame memory is produced by generating pulses whose number of pulses during a half cycle of the m-frequency-divided synchronizing signal is the same as the number of picture elements included in the single record line.

3. A buffering method according to claim 1, wherein a changeover signal for changing the sides of the buffer memories is produced by m-frequency-division of an output signal of a monostable multivibrator triggered by a synchronizing signal outputted from synchronizing signal generation means disposed at a position corresponding to a margin on the recording medium; a clock pulse for reading data from the reading side buffer memory is produced by generating pulses whose number of pulses during a time period between the trailing edge of the output pulse and the leading edge of a next output pulse from the monostable multivibrator is the same as the number of picture elements included in the single record line; a clock pulse for writing data to the writing side buffer memory and for reading data from the frame memory is produced by generating pulses whose number of pulses during a half cycle of the m-frequency-divided synchronizing signal is the same as the number of picture elements included in the single record line; and a margin on the starting side of one record line is set by a time period between the leading edge of an output of the monostable multivibrator and the trailing edge thereof next to the leading edge.

* * * * *